(12) United States Patent  (10) Patent No.: US 8,223,000 B2
Shiotsu et al.  (45) Date of Patent: Jul. 17, 2012

(54) INFORMATION ACCESS SYSTEM FOR ACCESSING INFORMATION IN CONTACTLESS INFORMATION STORAGE DEVICE, AND METHOD THEREFOR

(75) Inventors: Shinichi Shiotsu, Kawasaki (JP); Isamu Yamada, Kawasaki (JP); Akira Itasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1108 days.

(21) Appl. No.: 11/822,355

(22) Filed: Jul. 5, 2007

(65) Prior Publication Data

US 2007/0273486 A1   Nov. 29, 2007

Related U.S. Application Data

(63) Continuation of application No. PCT/JP2005/000270, filed on Jan. 13, 2005.

(51) Int. Cl.
   *H04Q 5/22* (2006.01)
(52) U.S. Cl. .............. 340/10.34; 340/10.1; 340/572.1
(58) Field of Classification Search .............. 340/10.34, 340/10.1, 10.2, 10.5, 5.61, 572.1; 455/41.1, 455/41.2, 556.1; 235/492
   See application file for complete search history.

(56) References Cited

U.S. PATENT DOCUMENTS

| | | | |
|---|---|---|---|
| 5,051,741 A * | 9/1991 | Wesby | 340/825.49 |
| 5,218,343 A * | 6/1993 | Stobbe et al. | 340/573.4 |
| 5,455,575 A * | 10/1995 | Schuermann | 342/42 |
| 5,751,220 A * | 5/1998 | Ghaffari | 340/825.21 |
| 6,127,928 A * | 10/2000 | Issacman et al. | 340/572.1 |
| 6,892,052 B2 * | 5/2005 | Kotola et al. | 455/41.2 |
| 7,145,437 B2 * | 12/2006 | Jalkanen et al. | 340/10.3 |
| 7,420,458 B1 * | 9/2008 | Kuzma et al. | 340/10.34 |

FOREIGN PATENT DOCUMENTS

| | | |
|---|---|---|
| JP | 11-39441 | 2/1999 |
| JP | 11-126240 | 5/1999 |
| JP | 2000-194803 | 7/2000 |
| JP | 2001-101351 | 4/2001 |
| JP | 2004-54515 | 2/2004 |
| WO | WO 00/65551 A1 | 11/2000 |

* cited by examiner

*Primary Examiner* — Edwin Holloway, III
(74) *Attorney, Agent, or Firm* — Fujitsu Patent Center

(57) ABSTRACT

An information access system includes: a passive contactless information storage device (500) capable of transmitting and receiving signals; a fixed-station information processing device (100) having an information processing unit, and a wireless transmitter for transmitting, in a contactless manner, a command signal for requesting transmission of information stored in the information storage device and supplying power in a contactless manner to the information storage device; and a mobile-station information processing device (200) having an information processing unit, an information presenting unit, a battery, and a wireless receiver for receiving a response signal for response to the command signal, from the information storage device in a contactless manner. While the fixed-station device is supplying power to the information storage device in the contactless manner, the information storage device transmits, in response to the command signal, the response signal to the mobile-station device in the contactless manner.

7 Claims, 7 Drawing Sheets

INFORMATION ACCESS SYSTEM FOR ACCESSING INFORMATION IN CONTACTLESS INFORMATION STORAGE DEVICE, AND METHOD THEREFOR

This application is a continuation of international application PCT/JP05/000270 filed Jan. 13, 2005.

FIELD OF THE INVENTION

The present invention relates generally to contactless reading and writing information from and to an information storage device such as a contactless IC card and an RF ID tag, and more particularly to a contactless reader that can be incorporated in a battery-powered mobile apparatus.

BACKGROUND ART

Recently, contactless or noncontact IC cards or smartcards and RF ID tags are becoming pervasive. A contactless IC card is applicable to the Japanese Resident Register ID card in compliance with the ISO 14443 standard, the electronic ticketing card, employee card and electronic money which are in compliance with the FeliCa™ standard, and the like. The RF ID tag is applicable to a merchandise management system, an inventory management system and a physical distribution system which are in compliance with the ISO 15693 standard, and other systems. Moreover, it is expected that RF ID tags are provided at various locations which can be used for location services. For example, the RF ID tags may be attached to exhibits in a museum or an art gallery. In this case, when a user carrying a mobile terminal comes in front of an exhibit, the mobile terminal may detect an RF ID tag and obtain information related to the exhibit. Currently, contactless reader/writer devices are used to read from and write to the respective contactless IC cards and RF ID tags.

Passive-type information storage devices or media, such as so-called passive contactless IC cards and RF ID tags, do not include batteries, and hence need to receive power from a contactless reader/writer device through electromagnetic induction. Thus the reader/writer device is required to drive a relatively large current. Consequently, when the reader/writer device is used, for example, as a sensor at an entrance gate or for login to a notebook personal computer or a mobile terminal, it must be permanently activated, because it is not known what kind of contactless IC card or RF ID tag is brought in its proximity and when it is brought in its proximity. This causes the reader/writer device to dissipate a large amount of power, and considerably shortens the battery run time.

Yamaoka in the Japanese Patent Application Publication JP 2000-194803 (A) published on Jul. 14, 2000 discloses a reader/writer for a non-contact IC card. A proximity sensor unit for detecting an object is provided in this reader/writer. When the proximity sensor unit does not detect an object of a non-contact IC card, transmission data of a command from a control unit is not transmitted through an I/O conversion unit, an oscillation unit, a modulation unit, a power amplification part and a transmission/reception coil. Only when the proximity sensor unit detects an object of a non-contact IC card, the reader/writer performs transmission and reception.

Kobayashi and Fujii in the Japanese Patent Application Publication JP 2001-101351 (A) published on Apr. 13, 2001 disclose a reader device. When a card detection unit of the reader device detects an IC card, the reader device sends a signal to a power supply control unit to power on a control unit and an RF transmission/reception unit, to thereby transit from a low power consumption mode to a normal mode. When it cannot communicate with the card for a given time, a host controller and a reader/writer transit back into the low power consumption mode.

The PCT international publication, WO 00/65551, published on Nov. 2, 2000, discloses supplying power for reading an RF ID only when action is detected by an infrared sensor.

Sasuga et al. in the Japanese Patent Application Publication JP HEI 11-126240 (A) published on May 11, 1999 discloses a reader/writer controller which, while in a standby state, transmits command data by intermittently turning on the power for a transmission section.

DISCLOSURE OF THE INVENTION

Extra circuits are required to incorporate an infrared sensor in a reader/writer, so that size, weight and cost may increase. Meanwhile, an infrared sensor may erroneously detect an irrelevant object other than a contactless IC card and an RF ID tag.

In order to intermittently turn on the power supply of a transmitting unit of the reader/writer, intervals of the turning on must be relatively short to prevent detection failures. Thus, no significant energy-saving effects can be expected of it.

When a plurality of mobile information processing devices of users simultaneously access an RF ID tag or a contactless IC card, a collision may occur between command signals transmitted from the plurality of mobile information processing devices to the RF ID tag, and the plurality of mobile information processing devices simultaneously and wastefully feed power to the RF ID tag, which is also wasteful.

The inventors have recognized that a collision of command signals transmitted from a plurality of mobile information processing devices to an RF ID tag can be prevented and power consumption of the mobile information processing devices can be reduced, by providing a separate RF ID tag reader/writer device for transmitting commands in addition to the mobile information processing devices each including an RF ID tag reader/writer for receiving information from an RF ID tag.

An object of the present invention is to prevent a collision among a plurality of command signals transmitted to a passive contactless information storage device.

Another object of the present invention is to reduce power consumption of a contactless reader device of a mobile device.

SUMMARY OF THE INVENTION

In accordance with an aspect of the invention, an information access system for accessing information in a contactless information storage device includes: a passive contactless information storage device capable of transmitting and receiving signals in a contactless manner; and a fixed-station information processing device. The fixed-station information processing device includes: a unit for processing information, and a wireless transmitter which both transmits, in a contactless manner, a command signal for requesting transmission of information that is stored in the passive contactless information storage device, and supplies power in the contactless manner to the passive contactless information storage device. The information access system further includes a mobile-station information processing device. The mobile-station information processing device includes a unit for processing information, a unit for presenting information, and a wireless receiver for receiving a response signal for response to the command signal, from the passive contactless information storage device in a contactless manner. While the fixed-station information processing device is supplying power to the passive contactless information storage device in the contactless manner, the passive contactless information storage device transmits, in response to the command signal, the response signal to the mobile-station information processing device in the contactless manner.

In accordance with another aspect of the invention, an information access system for accessing information in a contactless information storage device includes: a plurality of passive contactless information storage devices capable of transmitting and receiving signals in a contactless manner, at least first and second fixed-station information processing devices. Each of the at least first and second fixed-station information processing devices includes: a unit for processing information, and a wireless transmitter which both transmits a command signal in the contactless manner and supplies power in the contactless manner to predetermined one or ones of the passive contactless information storage devices. The information access system further includes one or more mobile-station information processing devices. Each of the mobile-station information processing device includes: a unit for processing information, a unit for presenting information, and a wireless receiver adapted to receive a response signal for response to the command signal in the contactless manner from one or ones of the passive contactless information storage devices that is or are located in a communication range of that mobile-station information processing device. The information access system further includes a timing supply device which both provides a timing signal for transmitting a command and supplies power to the at least first and second fixed-station information processing devices respectively in a predetermined cycle or at predetermined intervals. Each of the at least first and second fixed-station information processing devices receives corresponding ones of the timing signals, and transmits the command signal and supplies the power in response to the received timing signal. While each of the plurality of passive contactless information storage devices is receiving power in the contactless manner from one of the at least first and second fixed-station information processing devices, that passive contactless information storage device transmits the response signal for response to the command signal transmitted from the one fixed-station information processing device, in the contactless manner to one or ones of the mobile-station information processing devices that is or are located in a communication range of that passive contactless information storage device.

The invention also relates to a method for implementing the information processing devices described above.

According to the invention, a collision among a plurality of command signals transmitted to a passive contactless information storage device can be prevented, and power consumption of a passive contactless reader device of a mobile device can be reduced.

DESCRIPTION OF THE PREFERRED EMBODIMENTS

The embodiments of the invention will be described with reference to the accompanying drawings. Throughout the drawings, similar symbols and numerals indicate similar items and functions.

Figure 1A:
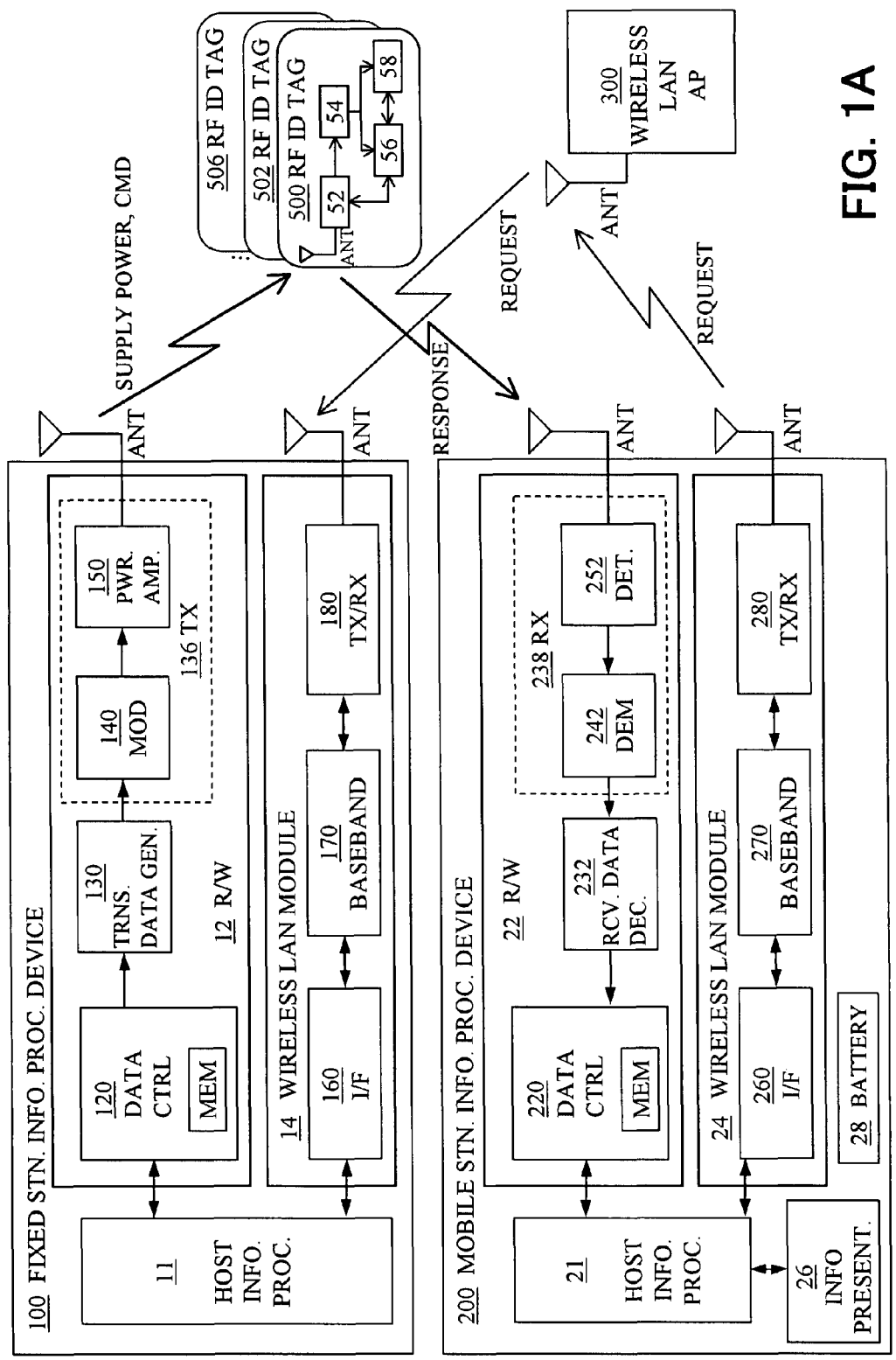
FIG. 1A illustrates a fixed-station information processing device including a contactless reader device or a contactless reader and writer (R/W) which transmits command signals for reading information, to RF ID tags as storage media, and a mobile-station information processing device including a contactless reader/writer which reads information in the RF ID tags, in accordance with an embodiment of the present invention.

FIG. 1A illustrates a fixed-station information processing device 100 including a contactless reader device or a contactless reader and writer device (R/W) (hereinafter, simply referred to as reader/writer) 12 which transmits command signals for reading information, to RF ID tags 500, 502, . . . 506 as passive contactless information storage devices, and illustrates a mobile-station information processing device 200 including a contactless reader/writer 22 which reads information in the RF ID tags 500 through 506, in accordance with an embodiment of the present invention.

The fixed-station information processing device 100 functions as a fixed station, and further includes a host information processing unit 11. The host information processing unit 11 processes information to be transmitted and other information in the fixed-station information processing device 100 and communicates the information and control signals with the reader/writer 12. The fixed-station information processing device 100 may use any kind of power supply, and may receive electric power from a commercial power outlet or a high-capacity battery for example. The reader/write 12 may supply power to the RF ID tags in a contactless manner, which raises no issue. The mobile-station information processing device 200 further includes a host information processing unit 21, an information presenting unit 26 including a display and a speaker for presenting received information, and a battery 28. The host information processing unit 21 communicates information and control signals with the reader/writer 22, and processes received information and other information in the mobile-station information processing device 200. The mobile-station information processing device 200 has preferably a small size and cannot include a high-capacity battery, and hence supplying long-time continuous power from the reader/writer 22 to the RF ID tags makes the run time of the battery become short is undesirable. The mobile-station information processing device 200 may be a mobile telephone, a PDA (Personal Digital Assistant) or the like. The fixed-station information processing device 100 may further include a wireless LAN module 14. The mobile-station information processing device 200 may further include a wireless LAN module 24.

In this embodiment, the RF ID tags 500 through 506 and the like are those of a passive type that receive power externally in a contactless manner by receiving electromagnetic waves or RF signals or by magnetic coupling or transformer coupling. These RF ID tags 500 through 506 and the like neither include batteries nor receive power via wires or wire cables from an external power supply. Each RF ID tag includes a coil antenna ANT, an RF modulator/demodulator circuit 52, a passive-type power supply circuit 54, a logic circuit 56, and a memory 58.

The reader/writer 12 includes a data control unit 120 coupled to the host information processing unit 11 and having a memory (MEM), a transmission data generation unit 130 coupled to the data control unit 120 and generating data for transmission, a transmitter unit (TX) 136, and a coil antenna (ANT). The transmitter unit 136 includes a modulator 140 for transmission and a transmission power amplifier 150 coupled to the coil antenna (ANT). The reader/writer 12 does not have to include a receiver unit and a circuit related to such a receiver unit. The wireless LAN module 14 includes an interface unit (I/F) 160 interfacing with the host information processing unit 11, a baseband unit 170, and a transceiver unit (TX/RX) 180 coupled to an antenna (ANT) and transmitting and receiving RF or wireless signals to and from the wireless LAN base station (AP).

The reader/writer 22 includes a data control unit 220 coupled to the host information processing unit 21 and having a memory (MEM), a coil antenna (ANT), a receiver unit (RX) 238 coupled to the coil antenna (ANT), and a received data decoding unit 232 decoding received data and providing the decoded data to the data control unit 220. The receiver unit 238 includes a detector 252 and a demodulator 242 for reception. The reader/writer 22 does not have to include a transmitter unit and a circuit related to such a transmitter unit. The wireless LAN module 24 includes an interface unit (I/F) 260 interfacing with the host information processing unit 21, a baseband unit 270, and a transceiver unit (TX/RX) 280 coupled to an antenna (ANT) and transmitting and receiving RF or wireless signals to and from the wireless LAN base station (AP).

Figure 1B:
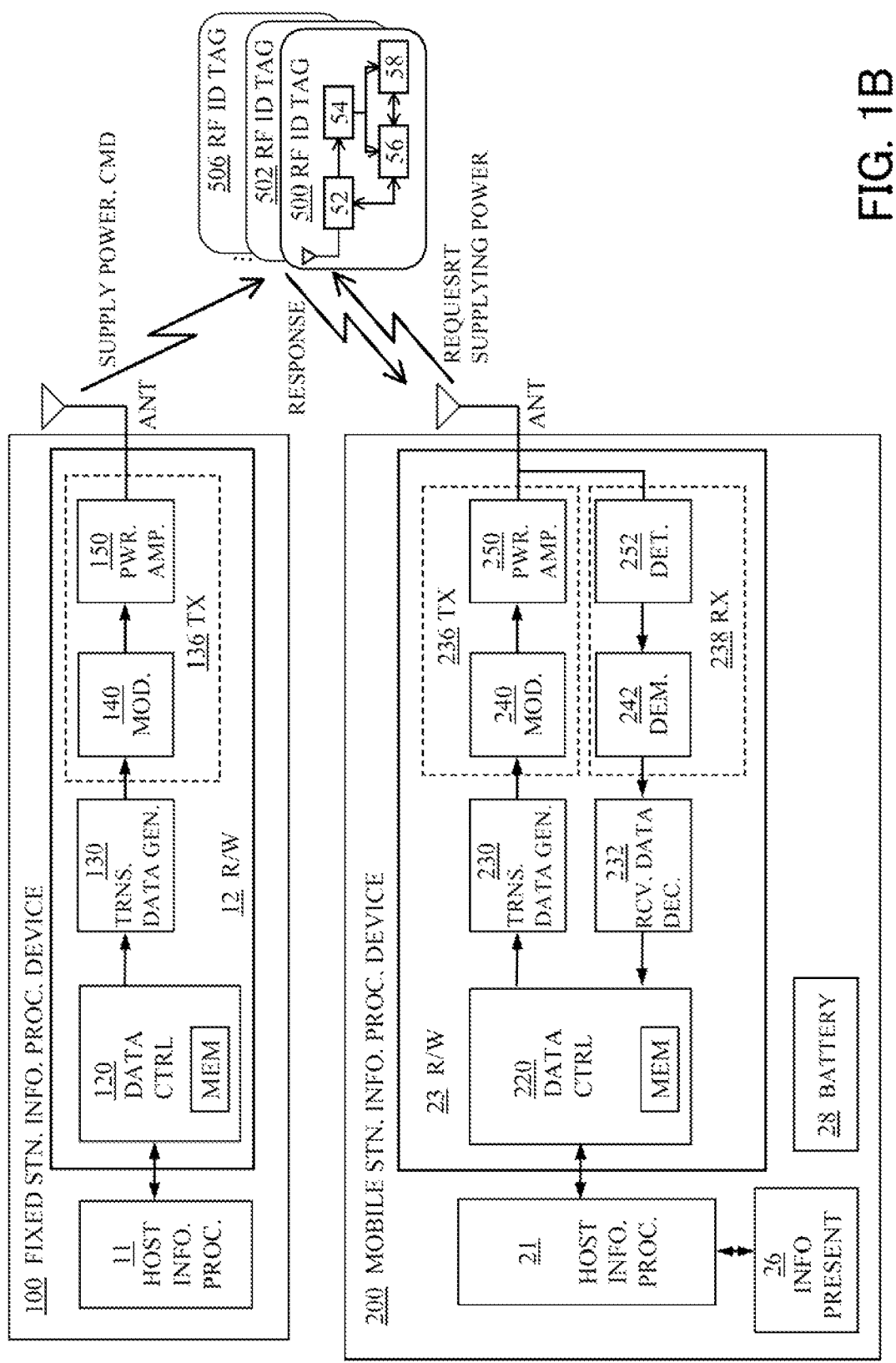
FIG. 1B illustrates a fixed-station information processing device including the reader/writer, and the mobile-station information processing device including a further reader/writer, in accordance with another embodiment of the invention.

FIG. 1B illustrates a fixed-station information processing device 100 including the reader/writer 12, and the mobile-station information processing device 200 including a further reader and writer 23, in accordance with another embodiment of the invention. The reader/writer 23 includes the data control unit 220, a transmission data generation unit 230 coupled to the data control unit 220 and generating data for transmission, a coil antenna (ANT), a transmitter unit (TX) 236 and the receiver unit (RX) 238 coupled to the coil antenna (ANT), and the received data decoding unit 232. The transmitter unit 236 includes a modulator 240 for transmission and a transmission power amplifier 250 coupled to the coil antenna (ANT). The reader/writer 12 may include a receiver unit and a received data decoding unit (not shown), similarly to those of the reader/writer 22.

Transmission and reception frequencies of the reader/writers 12, 22 and 23, and RF ID tags 500 through 506 may be in the wireless UHF band preferably having a communication range of a few meters, or may be in another wireless frequency band, such as the wireless HF band.

Referring to FIG. 1A, in fundamental operation, when the reader/writer 12 of the fixed-station information processing device 100 supplies power in a contactless manner to the RF ID tags 500-506 and transmits a command signal indicative of a request for reading out information, the RF ID tags 500-506 arranged at predetermined positions receive the power in a contactless manner and also receive the command signal. In response to the reception of the command signals, the RF ID tags 500-506, receiving the power, read out IDs and other required information stored in the RF ID tags 500-506, and transmit response signals formed by carrier signals RF-modulated with the IDs and the other information. The IDs carried by the response signals are IDs of the RF ID tags. The information carried by the response signals may be content information comprising audio, text and/or image information.

While the RF ID tags 500-506 receive the command signals and transmit the response signals, the reader/writer 12 transmits the modulated RF carrier signal and unmodulated RF carrier signal to supply power to the RF ID tags 500-506 for receiving the command signals and transmitting the response signals. When the mobile-station information processing device 200 carried by a user is located in the range of receiving the RF signals from the RF ID tags 500-506, e.g., in the range of a few meters from the RF ID tags 500-506, the reader/writer 22 of the mobile-station information processing device 200 is in a receive ready state and receives the response signals from the RF ID tags 500-506. Based on the received ID in the response signal, the host information processing unit 21 provides the received content information to the information presenting unit 26 for presentation. The information presenting unit 26 may be an information output unit, and the host information processing unit 21 may provide the content information to another device through the information output unit.

Figure 2A:
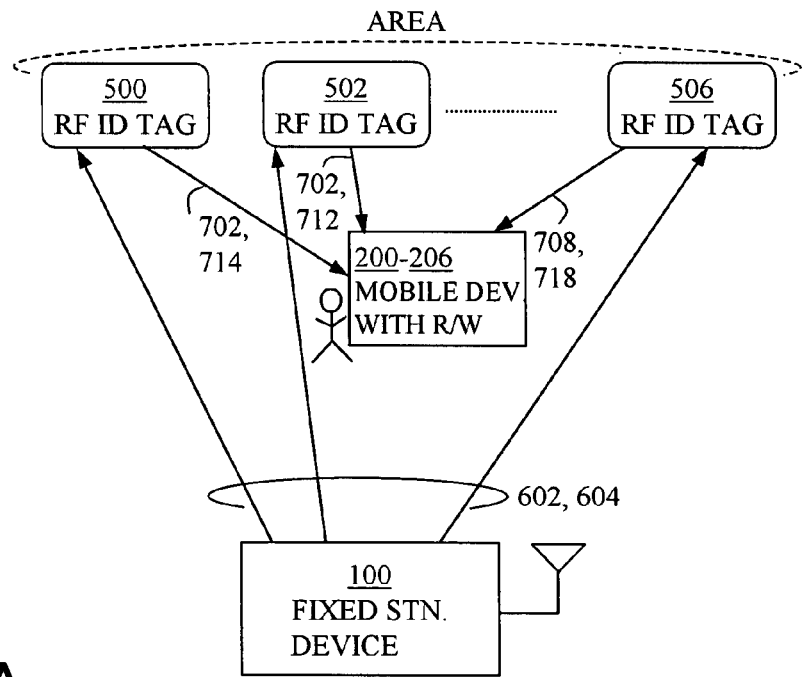
FIGS. 2A and 2B illustrate the fixed-station information processing device, the RF ID tags arranged at a plurality of locations distanced from each other in a wireless communication area, and mobile-station information processing devices carried by users.
Figure 2B:
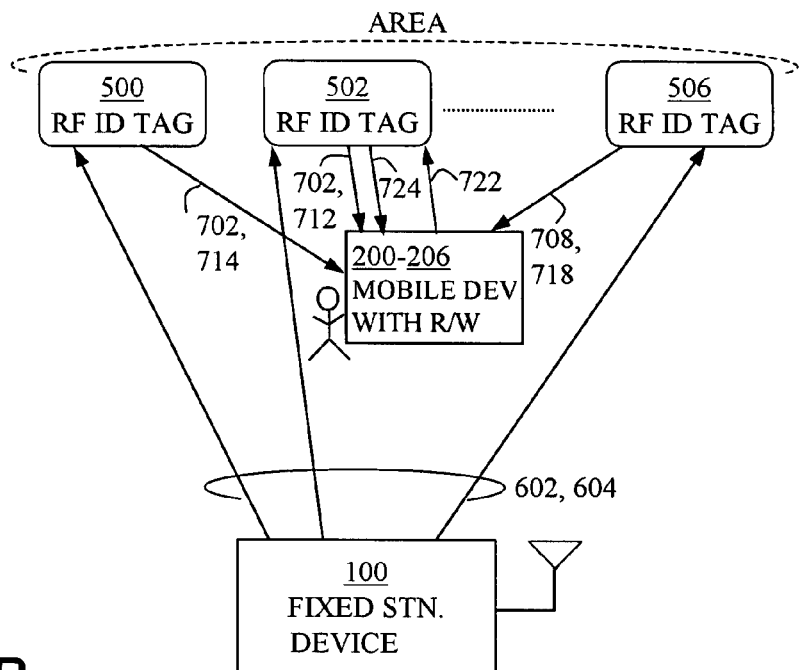

FIGS. 2A and 2B illustrate the fixed-station information processing device 100, the RF ID tags 500, 502, . . . 506 arranged at a plurality of locations distanced from each other in a wireless communication area, and mobile-station information processing devices 200, 202, . . . 206 carried by users. It is assumed that the users move in the area, and hence the mobile-station information processing devices 200-206 also move in the area. Each of the mobile-station information processing devices 202, . . . 206 has the same configuration as the mobile-station information processing device 200.

Figure 3A:
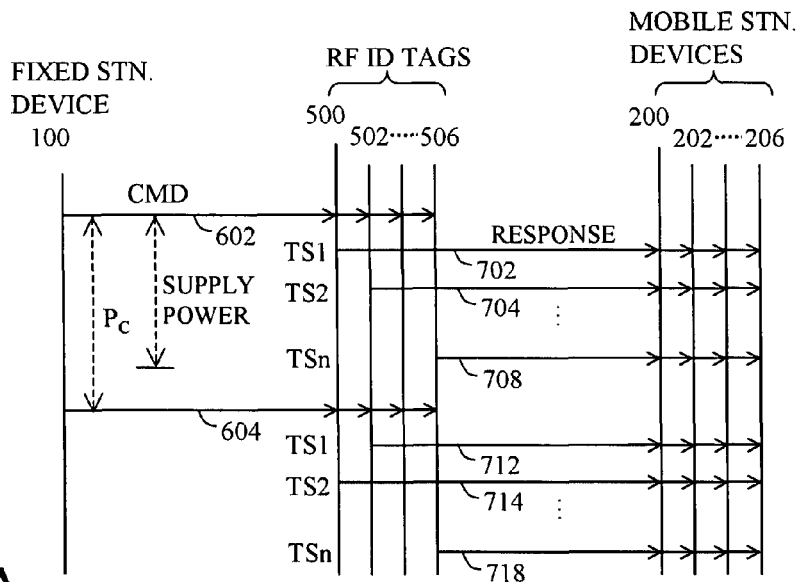
FIGS. 3A and 3B illustrate respective sequences of transmission and reception of signals among the fixed-station information processing device, the RF ID tags, and mobile-station information processing devices, shown in FIGS. 2A and 2B respectively.
Figure 3B:
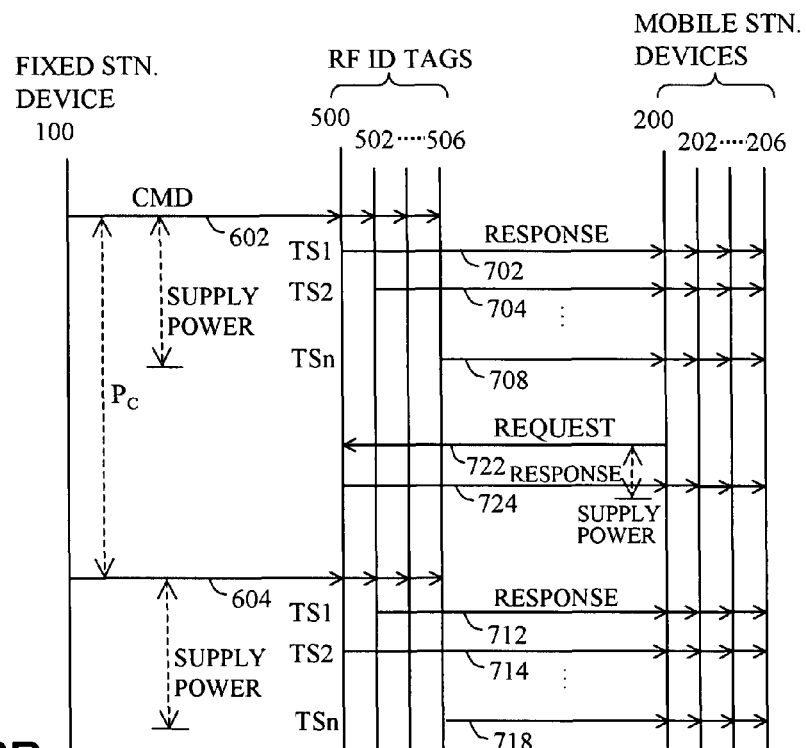

FIGS. 3A and 3B illustrate respective sequences of transmission and reception of signals among the fixed-station information processing device (hereinafter, referred to also as the fixed station device) 100, the RF ID tags 500, 502, . . . 506, and mobile-station information processing devices (hereinafter, referred to also as the mobile station device) 200, 202, . . . 206, shown in FIGS. 2A and 2B respectively.

Referring to FIGS. 1A, 2A and 3A, the fixed station device 100 transmits command signals 602, 604, . . . , each of which has transmission power for supplying power and includes commands indicative of requests for reading information, to the RF ID tags 500-506 in the area, by the use of the reader/writer 12 during a predetermined period of time, e.g. 10 ms, occurring in a cycle Pc of, for example, one second. In response to the reception of the RF signal 602, each of the RF ID tags 500-506 arranged in the predetermined area internally generates a random number, and transmits a response signal

702, 704, . . . 708 carrying the ID and the requested information in that RF ID tag, in one time slot TSi (1≦i≦n) that is selected from a plurality of time slots TS1-TSn in accordance with the random number. The width of one time slot TSi may be 10 ms for example. Similarly, in response to the next RF signal 604, each of the RF ID tags 500-506 transmits a response signal 712, 714, . . . 718 including the ID and the requested information of that RF ID tag in a time slot TSi selected in accordance with the random number. Each of the mobile station devices 200-206 receives the response signals 500-506, and presents corresponding content information to the presenting unit 26 in accordance with the ID selection by the user.

Thus, the RF command signals 602, 604, . . . are sequentially and cyclically transmitted to the RF ID tags 500-506 without collision with one another. When a plurality of RF ID tags happen to transmit the response signals in the same time slot, the response signals may collide with one another. The command signals 602, 603, . . . , however, are cyclically transmitted, so that the response signals can be transmitted successfully in a certain length of time without collision in different time slots selected according to the random numbers. The reader/writer 22 of each of the mobile station devices 200-206 does not cyclically transmit such signals, and hence requires minimal power only for reception. The power required for reception is smaller than the power required for transmission. Thus, the run time of the battery 28 is significantly extended.

Referring to FIGS. 1B, 2B and 3B, similarly, the fixed station device 100 cyclically transmits the command signals 602, 604, . . . . In response to the reception of the RF signal 602, each of the RF ID tags 500-506 transmits a response signal 702, 704, . . . 708, carrying the ID of that RF ID tag, or the ID and the requested information, in one time slot i that is selected from the plurality of time slots TS1-Tsn in accordance with the random number (1≦i≦n). Each of the mobile station devices 200-206 (FIG. 1B) receives the response signals 702-708.

After the time slot TSn for response, the mobile station device 200 transmits, to the RF ID tag 500, a request signal 722 which has transmission power for supplying power, requests reading of additional information, and contains a source ID of the mobile station device 200, and a destination ID of the RF ID tag 500 in accordance with the ID selected by the user. Such additional information may be content information including audio, text and/or image information. The request signal 722 may be transmitted in a time slot selected in accordance with a random number, which is generated in the host information processing unit 21 of the mobile station device 200. While the RF ID tag 500 receives the signal and transmits the response signal, the reader/writer 23 transmits a modulated RF carrier signal and an unmodulated RF carrier signal to thereby supply power to the RF ID tag 500 for receiving the request signal and transmitting the response signal. In response to the request signal 722, the RF ID tag 500 transmits a response signal 724 carrying the ID of the RF ID tag and the requested additional information. The mobile station device 200 receives the response signal 724, and then presents, to the presenting unit 26, the received additional information in accordance with the selected ID.

Further, similarly, in response to the reception of the next RF signal 604, each of RF ID tags 500-506 transmits a response signal 712, 714, . . . 718 carrying the ID of that RF ID tag and the requested information in a time slots TSi selected in accordance with the random number.

In this embodiment, the reader/writer 23 of the mobile station devices 200-206 only requires power for temporarily transmitting signals indicative of the requests according to the selection by the user, and minimal power for reception.

Figure 4:
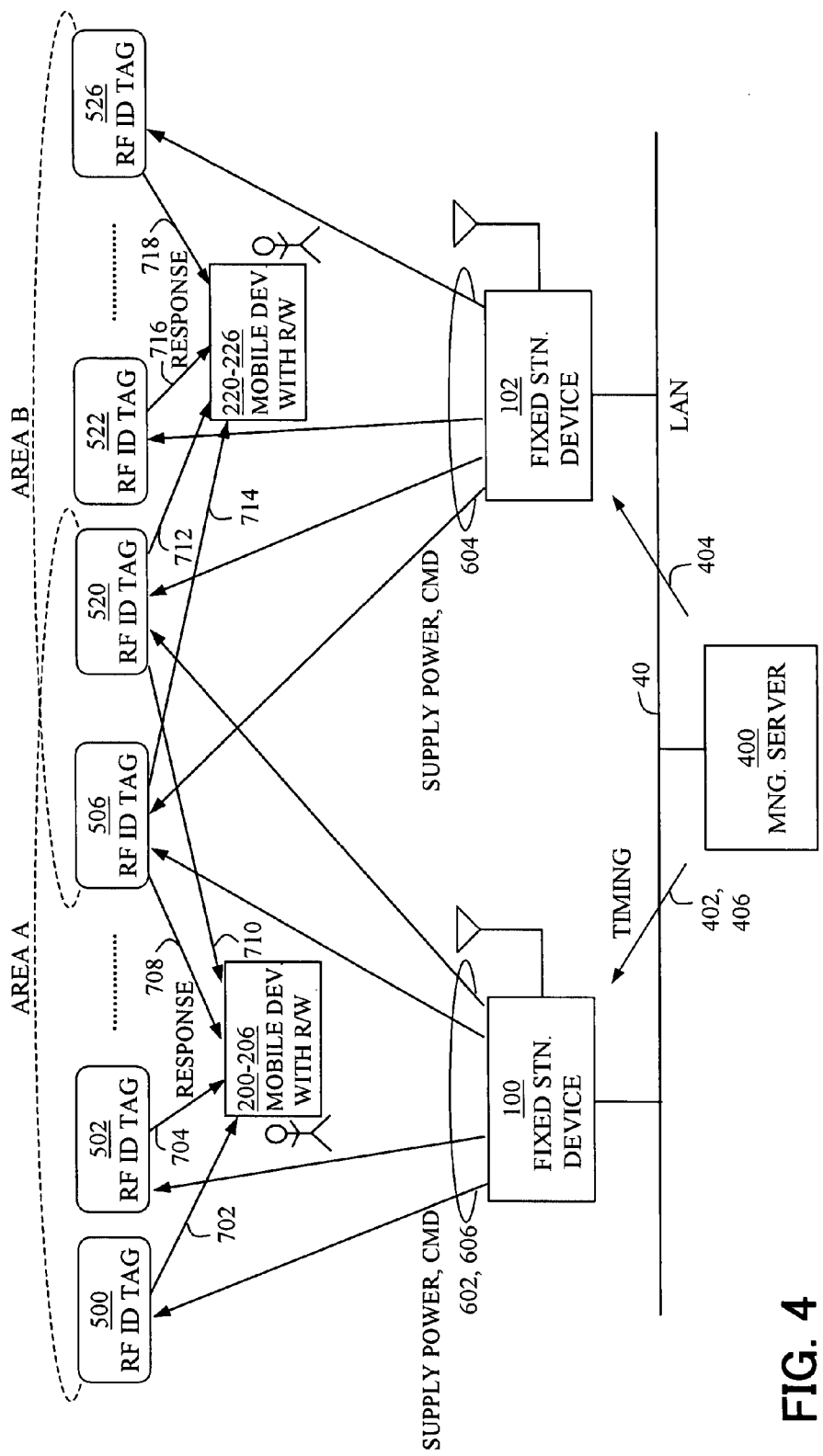
FIG. 4 illustrates fixed-station information processing devices arranged in association with the RF ID tags in wireless communication areas A and B, and a management server coupled to the fixed-station information processing devices via a wired LAN.

FIG. 4 illustrates fixed-station information processing devices 100 and 102 arranged in association with the RF ID tags 500, 502, . . . 506, 520, 522, . . . 526 in wireless communication areas A and B, and a management server 400 coupled to the fixed-station information processing devices 100 and 102 via a wired LAN 40. The fixed station device 100 covers the RF ID tags 500-506 and 520 in the wireless communication area A. The fixed station device 102 covers the RF ID tags 506, and 520-526 in the wireless communication area B which partially overlaps the wireless communication area A. As the users move, the mobile station devices 200-226 also move in the areas A and B and between the areas A and B.

Figure 5:
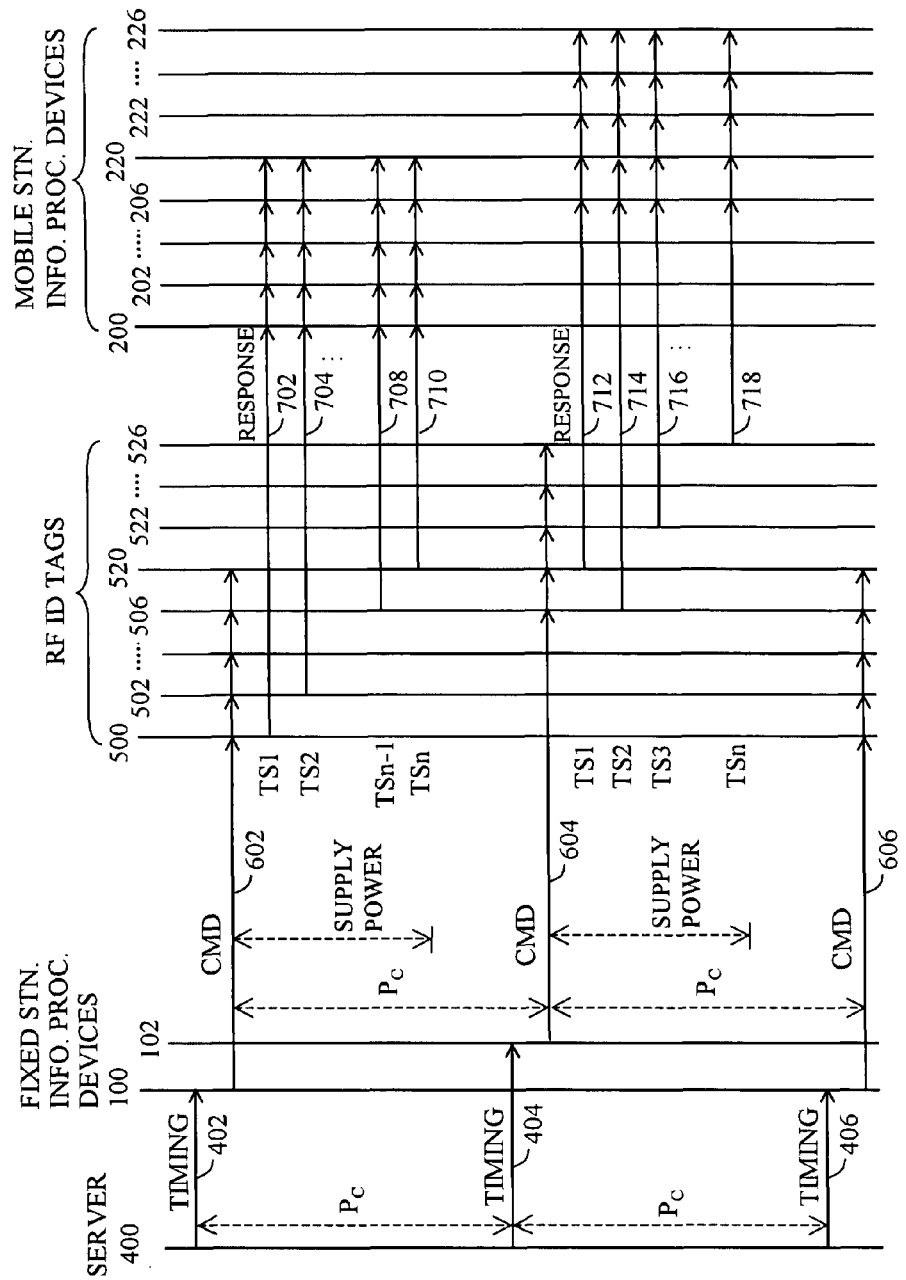
FIG. 5 illustrates a sequence of transmission and reception of signals among the plurality of fixed-station information processing devices, the RF ID tags, and the mobile-station information processing devices, shown in FIG. 4.

FIG. 5 illustrates a sequence of transmission and reception of signals among the plurality of fixed-station information processing devices 100 and 102, the RF ID tags 500-526, and the mobile-station information processing devices 200, 202 . . . 206, 220, 222, . . . 226, shown in FIG. 4. The fixed station device 102 has a configuration similar to that of the fixed station device 100. In this case, the mobile station devices 200-226 have the same configuration as shown in FIG. 1A.

Referring to FIGS. 1A, 4 and 5, the management server 400 transmits timing signals 402, 404, 406, . . . , to the plurality of fixed station devices 100 and 102 through the LAN 40, alternately or cyclically in a predetermined cycle Pc. In response to the reception of the corresponding timing signals 402, 404, 406, . . . , the fixed station devices 100 and 102 transmit corresponding RF command signals 602, 604, 606, . . . to the RF ID tags in the areas A and B.

In response to the reception of the RF command signals 602, each of the RF ID tags 500-506 and 520 transmits a response signal 702-710 carrying the ID of that RF ID tag and required information in a time slot TSi selected in accordance with the random number. Each of the mobile station devices 200-206 and 220 receives the response signals 702-710, and presents the required information to the information presenting unit 26 based on the ID selected by the user.

Similarly, in response to the reception of the RF command signal 604, each of the RF ID tags 520 and 522-526 transmits a response signal 712-718 carrying the ID of that RF ID tag and required information in a time slot TSi selected according to the random number. Each of the mobile station devices 206 and 220-226 receives the response signals 712-718 and presents required information to the information presenting unit 26 based on the ID selected by the user.

According to this embodiment, RF ID tags arranged in a wide area or in a plurality of wireless communication areas can be covered by the plurality of fixed station devices 100 and 102.

Figure 6:
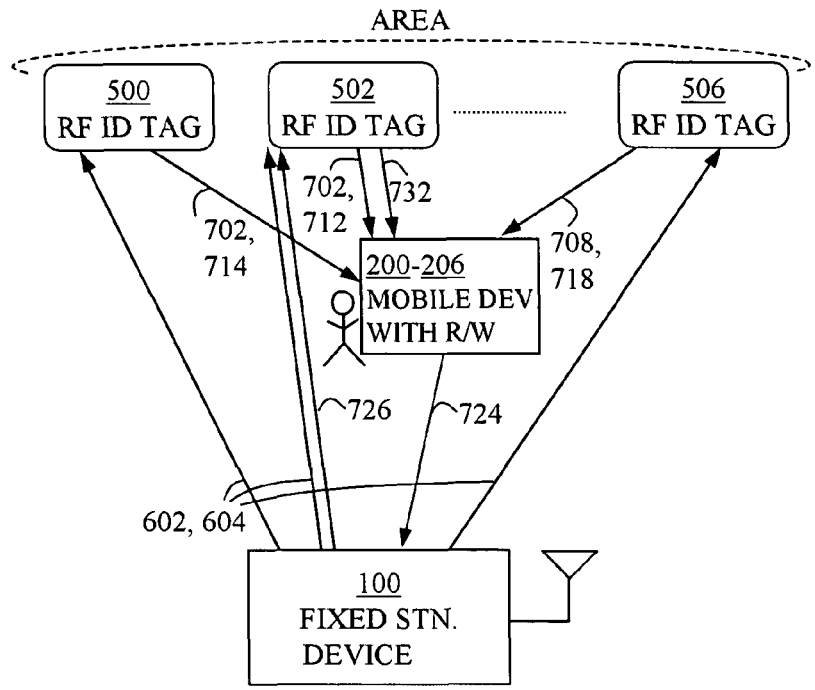
FIG. 6 illustrates modification of the embodiment of FIG. 2B, and shows the fixed-station information processing device, the RF ID tags arranged at a plurality of locations distanced from each other in the area, and the mobile-station information processing devices carried by the user.

FIG. 6 illustrates modification of the embodiment of FIG. 2B, and shows the fixed-station information processing device 100, the RF ID tags 500-506 arranged at a plurality of locations distanced from each other in the area, and the mobile-station information processing devices 200-206 carried by the user.

Figure 7:
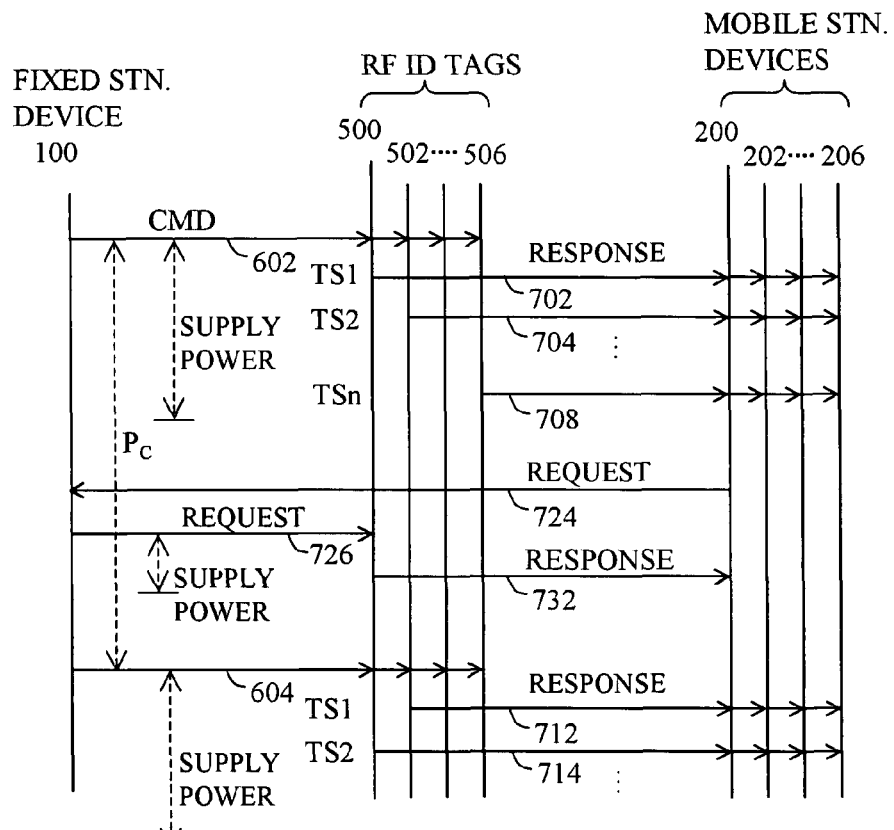
FIG. 7 illustrates a sequence of transmission and reception of signals among the fixed station information processing device, the RF ID tags, and the mobile-station information processing devices, shown in FIG. 6.

FIG. 7 illustrates a sequence of transmission and reception of signals among the fixed station information processing device 100, the RF ID tags 500-506, and the mobile-station information processing devices 200-206, shown in FIG. 6. In this case, the mobile station devices 200-206 has the same configuration as shown in FIG. 1A.

Referring to FIGS. 6 and 7, the fixed station device 100 transmits RF command signals 602, 604, . . . in the cycle Pc, each of which has transmission power for supplying power and carries a command indicative of a request for reading information. In response to the reception of the RF signal 602, each of the RF ID tags 500-506 transmits a response signal 702-708 carrying the ID of that RF ID tag or the ID and required information in one time slot TSi selected from a plurality of time slots TS1-TSn in accordance with the random number (1≦i≦n). Each of the mobile station devices 200-206 receives response the signals 702-708.

In response to the selection of an ID by the user, the mobile station device 200 transmits a request signal 724, which requests reading of additional information and contains a source ID of the mobile station device 200 and an ID of the RF ID tag 500 in accordance with the selected ID, to the fixed station device 100 via the wireless LAN base station (AP) 300 by the use of the wireless LAN module 24. The fixed station device 100 receives the request signal 724 through the wireless LAN module thereof. The request signal 724 may be transmitted in a time slot selected in accordance with a random number, which is generated in the host information processing unit 21 of the mobile station device 200. In response to the request signal 726, the fixed station device 100 transmits, through the reader/writer 12, a request signal 726 which has transmission power for supplying power and indicates a request for reading additional information. In response to the request signal 724, the RF ID tag 500 transmits a response signal 732 carrying the ID of the RF ID tag and the requested additional information. The mobile station device 200 receives the response signal 732 and presents the received additional information to the presenting unit 26 in accordance with the selected ID. After that, the fixed station device 100, the RF ID tags 500-506, and the mobile station devices 200-206 again transmit and receive similar signals in the cycle Pc.

According to this embodiment, the reader/writer 22 of each of the mobile station devices 200-206 does not require a configuration for the transmission to the RF ID tags, and may request reading of additional information of the RF ID tags.

The above-described embodiments are only typical examples, and their modifications and variations are apparent to those skilled in the art. It should be noted that those skilled in the art can make various modifications to the above-described embodiments without departing from the principle of the invention and the accompanying claims.

What is claimed is:

1. An information access system for accessing information in a contactless information storage device, the information access system comprising:
   a passive contactless information storage device to receive a command signal and transmit a response signal carrying at least an identification thereof, in a contactless manner;
   a fixed-station information processing device including;
      a unit to process information,
      a wireless receiver to receive a first request signal carrying the identification, and
      a wireless transmitter to transmit, in a contactless manner, a command signal for requesting transmission of information that is stored in the passive contactless information storage device, and supply power in the contactless manner to the passive contactless information storage device, and to transmit, in response to reception of the first request signal, a second request signal carrying the identification for requesting additional information to the passive contactless information storage device; and
   a mobile-station information processing device including;
      a unit to process information,
      a unit to present information,
      a wireless receiver to receive the response signal for response to the command signal and the response signal for response to the second request signal, directly from the passive contactless information storage device in a contactless manner, and
      a wireless transmitter to transmit, to the fixed-station information processing device, the first request signal carrying the identification as selected by a user from identifications carried by received response signals for response to the command signal, for requesting additional information.

2. An information access system according to claim 1, wherein the passive contactless information storage device is either an RF ID tag or a contactless IC card.

3. An information access system according to claim 1, wherein
   the mobile-station information processing device transmits a request signal for requesting transmission of a command signal, via the wireless transmitter thereof to the fixed-station information processing device, and
   in response to the request signal, the fixed-station information processing device both transmits a command signal and supplies power via the wireless transmitter thereof.

4. An information access system for accessing information in a contactless information storage device, the information access system comprising:
   a plurality of passive contactless information storage devices, each of which receives a command signal and transmits a response signal carrying at least an identification thereof, in a contactless manner,
   at least first and second fixed-station information processing devices, each of the at least first and second fixed-station information processing devices including:
      a unit to process information,
      a wireless receiver to receive a first request signal carrying a selected identification from a mobile station, and
      a wireless transmitter to transmit, in a contactless manner, a command signal for requesting transmission of information that is stored in any of the passive contactless information storage devices, and supply power in the contactless manner to one or ones of the passive contactless information storage devices, and to transmit, in response to reception of the first request signal, a second request signal carrying the selected identification for requesting additional information to one of the passive contactless information storage devices that has the selected identification;
   a timing supply device which provides a timing signal to transmit a command and supply power, to the at least first and second fixed-station information processing devices in a cycle or at intervals;
   one or more mobile-station information processing devices, each of the one or more mobile-station information processing devices including:
      a unit to process information,
      a unit to present information,
      a wireless receiver to receive the response signal for response to the command signal and the response signal for response to the second request signal in the contactless manner directly from one or ones of the passive contactless information storage devices that is or are located in a communication range of that mobile-station information processing device, and
      a wireless transmitter to transmit, to one of the at least first and second fixed-station information processing devices, the first request signal carrying the selected identification as selected by a user from identifications carried by the received response signals for response to the command signal, for requesting additional information.

5. A mobile information processing device comprising:
an information presenting unit;
a wireless transmitter to transmit, to the another information processing device, a first request signal carrying an identification of a passive contactless information storage device as selected by a user for requesting information that is stored in the passive contactless information storage device and selected from identifications carried by received response signals for response to a command signal from another information processing device, the another information processing device to supply power to the passive contactless information storage device in a contactless manner;
a wireless receiver to receive, in a contactless manner directly from the passive contactless information storage device, response signals carrying at least the identification that are transmitted respectively in response to reception of the command signal and in response to reception of a second request signal transmitted from the another information processing device in response to the first request signal; and
an information processing unit to present content information carried by the response signal, to the information presenting unit on the basis of the identification carried by the response signal.

6. In a system comprising a fixed-station information processing device and a mobile-station information processing device, a method of accessing information in a passive contactless information storage device configured to transmit and receive signals, the method comprising:
causing the fixed-station information processing device both to transmit, in a contactless manner, a command signal for requesting transmission of information stored in the passive contactless information storage device, and to supply power to the passive contactless information storage device in the contactless manner;
causing the mobile-station information processing device to receive, from the passive contactless information storage device in a contactless manner, a response signal carrying at least an identification of the passive contactless information storage device for response to the command signal, while the fixed-station information processing device is supplying power to the passive contactless information storage device in a contactless manner;
causing the mobile-station information processing device to transmit, to the fixed-station information processing device, a first request signal carrying an identification as selected by a user from identifications carried by received response signals, for requesting additional information;
causing the fixed-station information processing device to transmit, in response to reception of the first request signal, a second request signal carrying the selected identification for requesting additional information to the passive contactless information storage device; and
causing the mobile-station information processing device to receive, directly from the passive contactless information storage device in a contactless manner, a response signal carrying the identification and the additional information of the passive contactless information storage device for response to the second request signal, while the fixed-station information processing device is supplying power to the passive contactless information storage device in a contactless manner.

7. In a system comprising at least first and second fixed-station information processing devices, one or more mobile-station information processing devices, and a timing supply device for providing a timing signal for transmitting a command and supplying power, a method for accessing information in a passive contactless information storage device, the method comprising:
causing the timing supply device to transmit a timing signal to each of the at least first and second fixed-station information processing devices in a cycle or at intervals;
in response to the timing signal, causing each of the at least first and second fixed-station information processing devices to both transmit a command signal for requesting transmission of information stored in any of a plurality of passive contactless information storage devices and supply power, in a contactless manner to the passive contactless information storage devices;
causing one or ones of the mobile-station information processing devices that is or are located in communication ranges of the passive contactless information storage devices to receive response signals, each carrying at least an identification of a corresponding passive contactless information storage device, for response to the command signal in a contactless manner, while each passive contactless information storage device is receiving power in the contactless manner from the one of the at least first and second fixed-station information processing devices;
causing one of the mobile-station information processing devices to transmit, to one of the fixed-station information processing devices, a first request signal carrying an identification as selected by a user from identifications carried by received response signals, for requesting additional information;
causing the one fixed-station information processing device to transmit, in response to reception of the first request signal, a second request signal carrying the selected identification for requesting additional information to the passive contactless information storage device that has the selected identification; and
causing the one mobile-station information processing device to receive, directly from the passive contactless information storage device that has the selected identification, a response signal carrying at least the selected identification of the passive contactless information storage device, for response to the second request signal in a contactless manner, while the passive contactless information storage device is receiving power in the contactless manner from the one fixed-station information processing device.

* * * * *